(12) United States Patent
Lin et al.

(10) Patent No.: US 10,203,662 B1
(45) Date of Patent: Feb. 12, 2019

(54) OPTICAL POSITION SENSOR FOR A CROWN

(71) Applicant: Apple Inc., Cupertino, CA (US)

(72) Inventors: Chin Han Lin, Cupertino, CA (US); Stephen N. Sweet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/714,691

(22) Filed: Sep. 25, 2017

(51) Int. Cl.
*G04B 3/04* (2006.01)
*G01D 5/26* (2006.01)
*G04G 21/00* (2010.01)

(52) U.S. Cl.
CPC ............... *G04B 3/046* (2013.01); *G01D 5/26* (2013.01); *G04G 21/00* (2013.01)

(58) Field of Classification Search
CPC ........... G04B 3/046; G01D 5/26; G04G 21/00
See application file for complete search history.

(56) References Cited

U.S. PATENT DOCUMENTS

| | | | |
|---|---|---|---|
| 4,199,741 A | 4/1980 | Serrus Paulet | |
| 4,275,674 A | 6/1981 | Carbonato | |
| 4,336,446 A | 6/1982 | Hafner | |
| 4,618,995 A | 10/1986 | Kemp | |
| 4,639,595 A * | 1/1987 | Okita | G01D 5/347 250/227.11 |
| 4,641,182 A | 1/1987 | Gur | |
| 4,668,911 A | 5/1987 | Mueller | |
| 5,047,629 A | 9/1991 | Geist | |
| 5,382,792 A | 1/1995 | Hurst et al. | |
| 5,748,111 A | 5/1998 | Bates | |
| 5,867,082 A | 2/1999 | Van Zeeland | |
| 6,128,006 A | 10/2000 | Rosenberg et al. | |
| 6,252,825 B1 | 6/2001 | Perotto | |
| 6,639,206 B1 | 10/2003 | Rothamel et al. | |
| 6,707,443 B2 | 3/2004 | Bruneau et al. | |
| 6,862,832 B2 | 3/2005 | Barrett | |
| 7,034,237 B2 | 4/2006 | Ferri et al. | |
| 7,135,673 B2 | 11/2006 | Saint Clair | |
| 7,190,638 B2 | 3/2007 | Oguchi | |
| 7,230,959 B2 | 6/2007 | Johnson | |
| 7,265,336 B2 | 9/2007 | Hataguchi | |
| 7,385,874 B2 | 6/2008 | Vuilleumier | |
| 7,404,667 B2 | 7/2008 | Born et al. | |

(Continued)

FOREIGN PATENT DOCUMENTS

WO   WO 09/023395   2/2009
WO   WO 15/021391   2/2015

(Continued)

*Primary Examiner* — Michael C Bryant
(74) *Attorney, Agent, or Firm* — Brownstein Hyatt Farber Schreck, LLP

(57) ABSTRACT

An electronic device includes an input device having a moveable shaft, a reflective surface, an optical energy transmitter, and optical energy receivers that receive optical energy transmitted by the optical energy transmitter and reflected by the reflective surface. Movement of the moveable shaft changes the optical energy received by the optical energy receivers. The movement or position of the shaft may be determined by analyzing the optical energy received. Detectable movement may include rotation, rotation speed, rotation direction, translation, tilt, displacement, and so on. The optical energy receivers may be configured in concentric rings.

20 Claims, 21 Drawing Sheets

(56) References Cited

U.S. PATENT DOCUMENTS

| | | |
|---|---|---|
| 7,520,664 B2 | 4/2009 | Wai |
| 7,969,337 B2 | 6/2011 | Ratnakar et al. |
| 8,002,089 B2 | 8/2011 | Jasso et al. |
| 8,220,987 B2 | 7/2012 | Kimura et al. |
| 8,305,171 B2 | 11/2012 | Kimura et al. |
| 8,350,562 B2 | 1/2013 | Gailledrat |
| 8,395,111 B2 | 3/2013 | Le |
| 8,577,289 B2 | 11/2013 | Schlub et al. |
| 8,649,004 B2 | 2/2014 | Schulz et al. |
| 8,743,083 B2 | 6/2014 | Zanone et al. |
| 8,759,747 B2 | 6/2014 | Ishizuka |
| 8,783,944 B2 | 7/2014 | Doi |
| 8,810,517 B2 | 8/2014 | Goto et al. |
| 8,824,245 B2 | 9/2014 | Lau et al. |
| 8,847,145 B2 | 9/2014 | Masa |
| 9,088,282 B2 | 7/2015 | Holenarsipur et al. |
| 9,091,715 B2 | 7/2015 | Alameh et al. |
| 9,188,462 B2 | 11/2015 | Omoto et al. |
| 9,223,296 B2 | 12/2015 | Yang |
| 9,483,031 B2 | 11/2016 | Yanagisawa |
| 9,490,804 B2 | 11/2016 | Hanumanthaiah et al. |
| 9,651,405 B1 * | 5/2017 | Gowreesunker ..... G01D 5/3473 |
| 2003/0201979 A1 | 10/2003 | Sandage et al. |
| 2007/0242569 A1 | 10/2007 | Inoue et al. |
| 2008/0290261 A1 | 11/2008 | Doe |
| 2010/0163716 A1 * | 7/2010 | Villaret .............. G01D 5/34723 250/227.28 |
| 2010/0282955 A1 | 11/2010 | Poon |
| 2012/0242626 A1 | 9/2012 | Hu |
| 2014/0049496 A1 | 2/2014 | Szalkowski |
| 2015/0048242 A1 | 2/2015 | Remillard et al. |
| 2016/0058375 A1 | 3/2016 | Rothkopf |
| 2016/0061636 A1 | 3/2016 | Gowreesunker et al. |
| 2016/0069712 A1 | 3/2016 | Holenarsipur et al. |
| 2016/0069713 A1 | 3/2016 | Ruh et al. |
| 2016/0109861 A1 | 4/2016 | Kim et al. |
| 2016/0258784 A1 | 9/2016 | Boonsom et al. |
| 2016/0313794 A1 | 10/2016 | Moussette et al. |
| 2016/0313808 A1 | 10/2016 | Wu et al. |
| 2017/0090592 A1 | 3/2017 | Ely et al. |
| 2017/0248446 A1 | 8/2017 | Gowreesunker et al. |

FOREIGN PATENT DOCUMENTS

| | | |
|---|---|---|
| WO | WO 15/034960 | 3/2015 |
| WO | WO 15/122885 | 8/2015 |

* cited by examiner

OPTICAL POSITION SENSOR FOR A CROWN

FIELD

The described embodiments relate generally to optical position sensing. More particularly, the present embodiments relate to optically sensing motion of an input device such as a watch crown.

BACKGROUND

Electronic devices may include a variety of different input and/or output devices for interacting with users. Examples of output devices include displays, speakers, vibration and/or other haptic devices, and so on. Examples of input devices include keyboards, computer mice, buttons, dials, knobs, joysticks, microphones, track pads, track balls, touch screens, touch sensors, touch pads, and so on. Some input devices include a structure that is moveable by a user to provide input.

For example, input devices such as watch crowns or joysticks may include a shaft that can be moved in one or more ways. An input device may include various mechanisms for detecting and/or measuring movement of a shaft. For example, movement of a shaft may connect and/or disconnect one or more sets of electrical contacts. As another example, a shaft may be moved to exert and/or relieve pressure on one or more dome switches. In yet another example, movement of a shaft may compress dielectric gel to move electrodes of one or more capacitive sensors with respect to each other.

SUMMARY

The present disclosure relates to an electronic device that optically determines movement of an input device such as a watch crown. An optical sensor assembly transmits light or other optical energy at a reflector and receives the reflected light. Movement of the input mechanism changes where the reflector reflects the light. Based on those changes, the electronic device determines the motion of the input mechanism. Determined motion may include rotation, rotation speed, rotation direction, translation, tilt, displacement, and so on.

In various embodiments, an electronic device includes a crown having a shaft. The crown is operable to rotate and translate the shaft. The shaft has an end defining a sloped surface. An optical energy transmitter transmits optical energy toward the sloped surface, and concentric rings of optical energy receivers that encircle the optical energy transmitter are operable to receive reflected optical energy from the sloped surface. A first position of the shaft determines a second position of the reflected optical energy on the optical energy receivers and a variable output of the optical energy receivers.

In some examples, rotation of the shaft rotates the reflected optical energy along the concentric rings. In various examples, translation of the shaft toward the optical energy transmitter shifts the reflected optical energy from an outer ring of the concentric rings toward an inner ring of the concentric rings. In some examples, translation of the shaft away from the optical energy transmitter shifts the reflected optical energy from an inner ring of the concentric rings toward an outer ring of the concentric rings.

In various examples, the shaft has a length that terminates at the end and is perpendicular to the optical energy transmitter, with the sloped surface facing the optical energy transmitter. In some examples, the optical energy receivers are photodiodes. In some examples, the optical energy transmitter is an infrared light emitting diode.

In some embodiments, an electronic device includes an input device comprising a moveable shaft, a collar attached to the moveable shaft, an optical energy transmitter, and a set of optical energy receivers. The collar has a reflective surface positioned thereon. The optical energy receivers receive optical energy transmitted by the optical energy transmitter and reflected by the reflective surface. Movement of the moveable shaft changes the optical energy received by the set of optical energy receivers.

In some examples, the electronic device further includes a switch. Movement of the moveable shaft is operable to actuate the switch. In some embodiments of such examples, the switch is electrically connected to the moveable shaft.

In various examples, the set of optical energy receivers includes a first set of circularly arranged optical energy receivers and a second set of circularly arranged optical energy receivers positioned around and aligned with the first set of circularly arranged optical energy receivers. In other examples, the set of optical energy receivers includes a first set of circularly arranged optical energy receivers and a second set of circularly arranged optical energy receivers positioned around and radially offset from the first set of circularly arranged optical energy receivers.

In some examples, the input device is a watch crown or joystick. In some examples, the optical energy transmitter is coupled to the moveable shaft.

In various embodiments, an electronic device has a shaft including a reflector, an optical energy transmitter operable to transmit optical energy at the reflector, a group of optical energy receivers operable to receive reflected optical energy from the reflector, and a processing unit. The group of optical energy receivers is disposed in a first circle and a second circle, with the second circle located within the first circle. The processing unit is operable to determine a position of the shaft based on the reflected optical energy received by the group of optical energy receivers.

In some examples, the processing unit is operable to determine a speed or direction of a rotation of the shaft based on the reflected optical energy received by the group of optical energy receivers. In some examples, the processing unit is operable to determine a translation of the shaft based on the reflected optical energy received by the group of optical energy receivers. In some examples, the processing unit is operable to determine a tilt of the shaft based on the reflected optical energy received by the group of optical energy receivers.

In some examples, the processing unit is operable to determine a displacement of the shaft based on the reflected optical energy received by the group of optical energy receivers. In some examples, the processing unit determines a rotation of the shaft by comparing the reflected optical energy received by optical energy receivers of the group of optical energy receivers.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
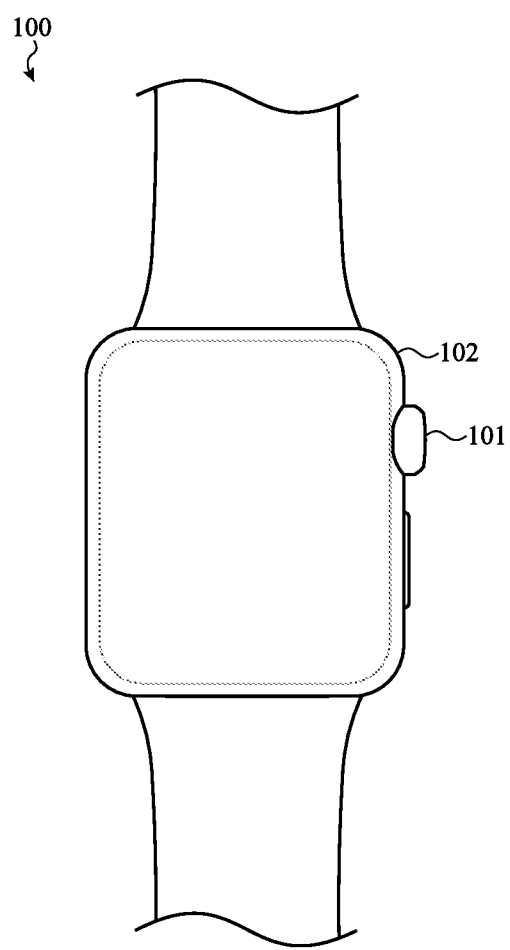
FIG. 1A depicts a wearable device that includes a crown having a movable shaft, which movement is detectable by an optical sensor.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

The following disclosure relates to optically sensing motion of an input device, such as a watch crown, headlamp switch, stereo ON/OFF/Volume switch, or a joystick. An electronic device includes an input mechanism that may be manipulated by a user to provide input. An optical sensor assembly may transmit light or other optical energy toward a reflector and receive the reflected light. Movement of the input mechanism may change where the reflector reflects the light. Based on changes in where the reflected light is received, the electronic device may determine the position or motion of the input mechanism. The electronic device may be able to detect rotation of the input mechanism; a rotation speed; a rotation direction; translation, tilt, or other displacement of the input mechanism; and so on. In this way, the electronic device may determine the position or movement of the input mechanism without causing wear on contacting parts. Space may also be conserved as components such as dome switches may not be used in some embodiments.

For example, an electronic device may include a crown having a shaft. The crown may be operable to rotate and translate the shaft. The shaft may have an end defining a sloped surface. The electronic device may further include an optical energy transmitter that transmits optical energy toward the sloped surface, and concentric rings of optical energy receivers that encircle the optical energy transmitter and are operable to receive reflected optical energy from the sloped surface. A position of the shaft may determine a position of the reflected optical energy on the optical energy receivers and a variable output of the optical energy receivers.

In another example, an electronic device may include an input device having a moveable shaft, and a collar attached to the moveable shaft. The collar may have a reflective surface positioned thereon. The electronic device may also include an optical energy transmitter, and a set of optical energy receivers that receive optical energy transmitted by the optical energy transmitter and reflected by the reflective surface. Movement of the moveable shaft may change the optical energy received by the set of optical energy receivers.

In still another example, an electronic device may include a shaft including a reflector, an optical energy transmitter operable to transmit optical energy at the reflector, a group of optical energy receivers operable to receive reflected optical energy from the reflector, and a processing unit. The processing unit may be operable to determine a position of the shaft based on the reflected optical energy received by the group of optical energy receivers.

In some embodiments, the reflector may be a sloped surface at the end of a shaft of the input device. In other embodiments, the reflector may be a surface of a collar or other component coupled to such a shaft. In still other embodiments, the reflector may be separate from the shaft and the shaft may include components for transmitting light toward the reflector and/or receiving reflected light from the reflector.

These and other embodiments are discussed below with reference to FIGS. 1-13. However, those skilled in the art will readily appreciate that the detailed description given herein with respect to these figures is for explanatory purposes only and should not be construed as limiting.

Figure 1B:
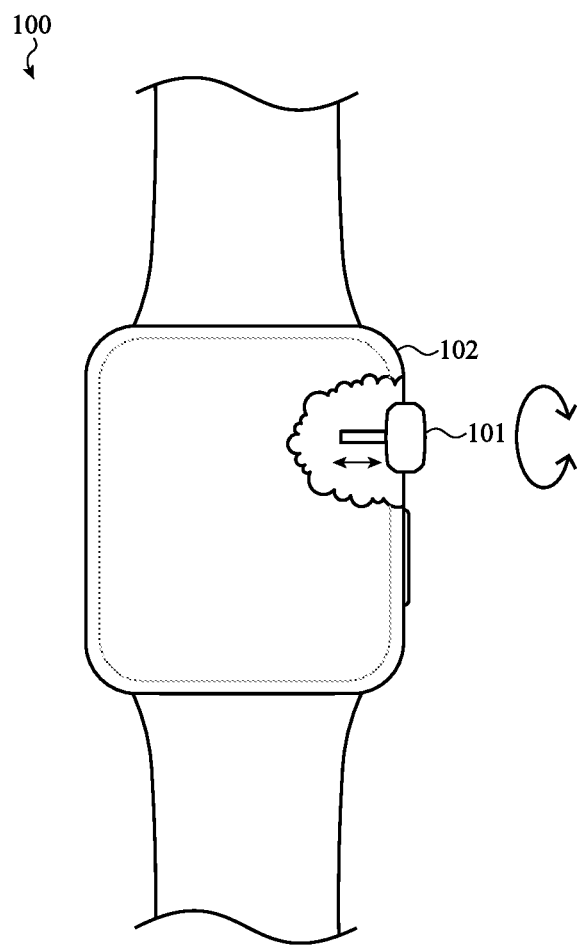
FIG. 1B depicts the wearable device of FIG. 1A with portions removed to show the shaft of the crown and example directions in which the crown may move the shaft.

FIG. 1A depicts a wearable device 100 that includes a crown having a movable shaft 101, which movement is detectable by an optical sensor. The wearable device 100 includes a housing 102. The crown is operable to move the shaft 101 with respect to the housing 102 when manipulated by a user in order to function as an input device. For example, the crown may be operable to rotate the shaft, translate the shaft toward the housing 102, translate the shaft away from the housing 102, tilt the shaft with respect to the housing 102, and so on. FIG. 1B depicts the wearable device 100 of FIG. 1A with portions removed to show the shaft 101 of the crown and example directions in which the crown may move the shaft 101.

Figure 2A:
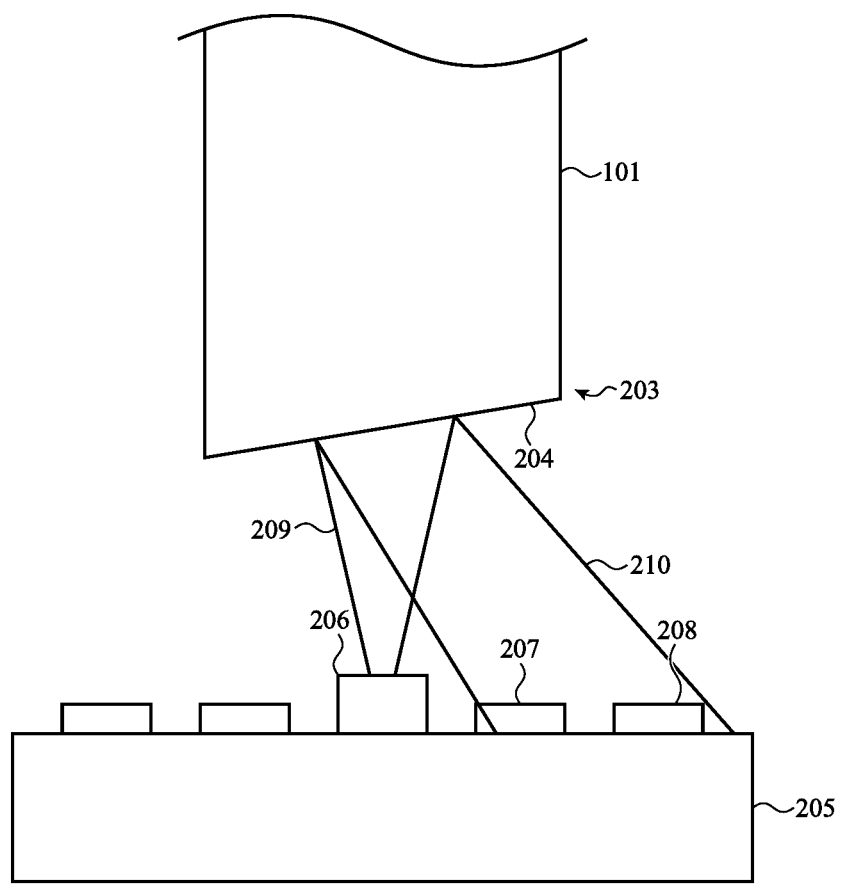
FIG. 2A depicts an axial cross-section of an internal end of the crown shaft shown in FIG. 1B, and an exemplary relation of the shaft to an optical sensor assembly.

FIG. 2A depicts an axial cross-section of an internal end 203 of the crown shaft 101 shown in FIG. 1B, and an exemplary relation of the shaft to an optical sensor assembly 205. The optical sensor assembly 205 includes an optical energy transmitter 206 that transmits light 209 or other optical energy toward a sloped surface 204 (e.g., sloped in that the sloped surface 204 is acutely or obliquely angled with respect to an axis of the shaft 101 or the optical energy transmitter 206 such that movement of the shaft 101 changes where and/or how the sloped surface 204 reflects light) on the end 203 or other reflector. The sloped surface 204 reflects the light 209 as reflected light 210 toward optical energy receivers 207, 208 of the optical sensor assembly 205. The sloped surface 204 is configured such that movement of the shaft 101 changes where the reflected light 210 is received on the optical sensor assembly 205.

Figure 2B:
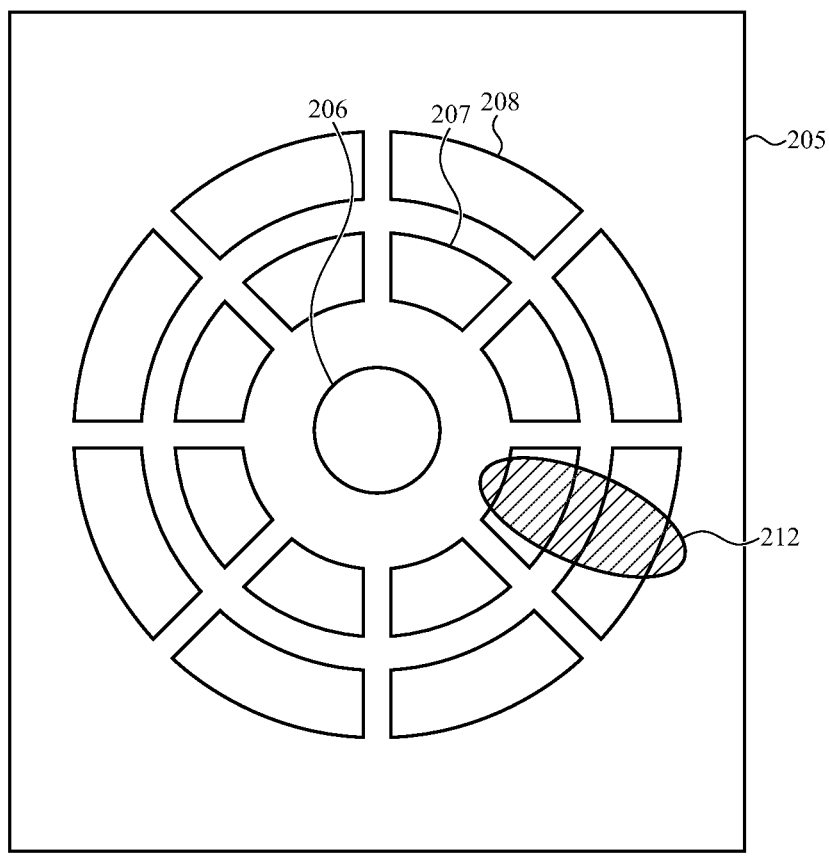
FIG. 2B depicts a plan view of the optical sensor assembly of FIG. 2A.

FIG. 2B depicts a plan view of the optical sensor assembly 205 of FIG. 2A. The optical energy receivers 207, 208 are configured as sets or groups of concentric rings of optical energy receivers 207, 208 (i.e., a first set of circularly arranged optical energy receivers 207 and a second set of circularly arranged optical energy receivers 207 positioned around the first set of circularly arranged optical energy receivers 208 or a first circle of optical energy receivers 208 and a second circle optical energy receivers 207 located within the first circle) that encircle the optical energy transmitter 206. The optical energy receivers 207 may be an inner set or ring of optical energy receivers 207 that are positioned within an area defined by an outer set or ring of optical energy receivers 208. A position 212 illustrates where the reflected light 210 is received on the optical sensor assembly 205.

Figure 3A:
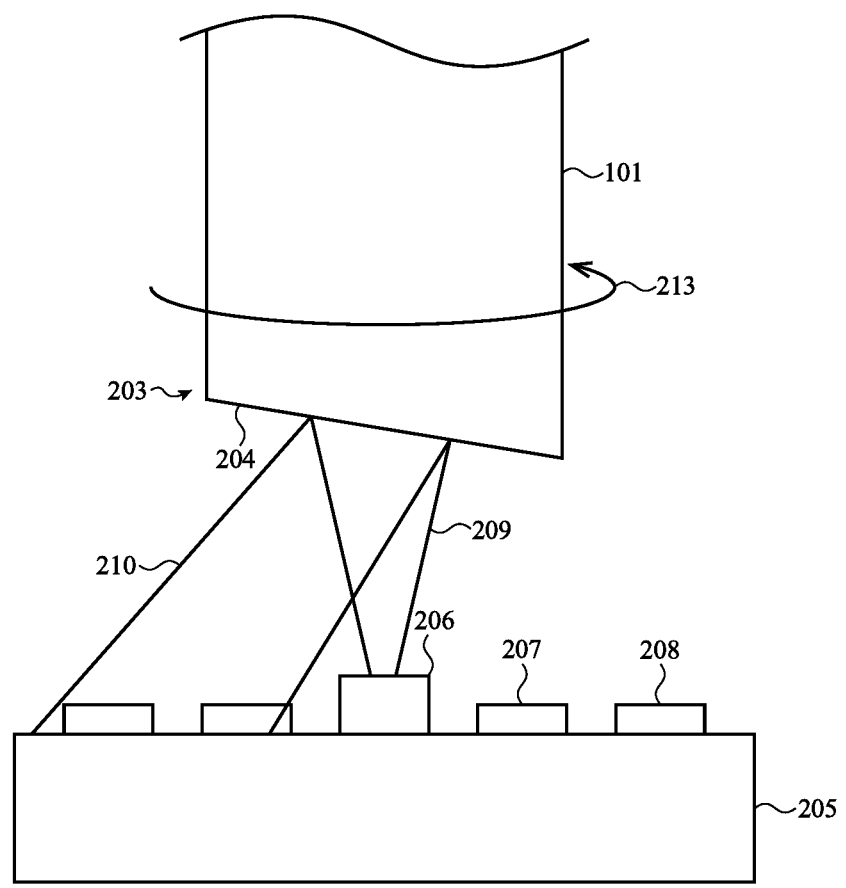
FIG. 3A depicts rotation of the crown shaft of FIG. 2A.
Figure 3B:
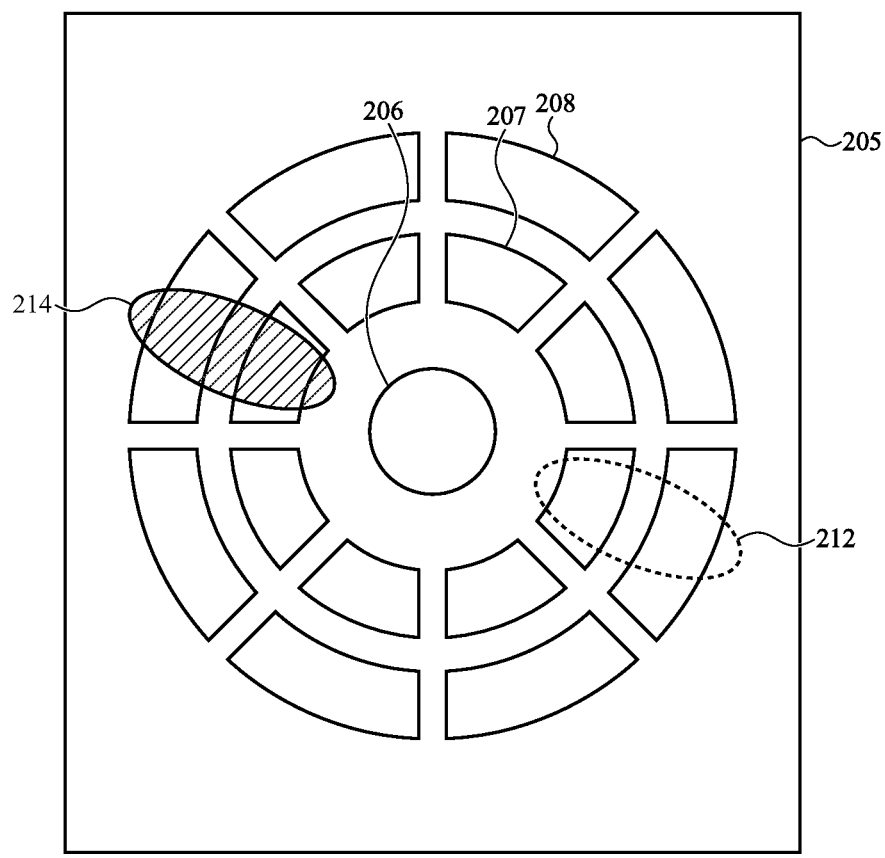
FIG. 3B depicts rotation of reflected light on the optical sensor assembly of FIG. 2B when the crown shaft rotates as illustrated in FIG. 3A.

Movement of the shaft 101 and how this movement changes where the reflected light 210 is received on the optical sensor assembly 205 will now be described. FIG. 3A depicts rotation 213 of the shaft 101. As illustrated, the rotation 213 of the shaft 101 is in a counter clockwise direction with respect to the optical energy transmitter 206. FIG. 3B depicts rotation of the reflected light 210 on the optical sensor assembly 205 when the crown shaft rotates as illustrated in FIG. 3A. As shown, the rotation 213 of the shaft 101 rotates the reflected light 210 along the concentric rings of the optical energy receivers 207, 208 from the previous position 212 to a new position 214. The rotation of the reflected light 210 between the previous position 212 to the new position 214 directly corresponds to the rotation 213 of the shaft 101 and thus the movement of the sloped surface 204. Data from the optical energy receivers 207, 208 may be compared (such as by a processor or other processing unit or controller comparing light received by the optical energy receivers 207, 208 when the reflected light 210 is at the previous position 212 and the new position 214) to determine rotation 213 of the shaft 101, a speed of the rotation 213, a direction of the rotation 213, and so on.

The rings, circles, and/or other circular arrangements of the optical energy receivers 207, 208 may correspond to a path that the reflected light 210 may move along on optical sensor assembly 205 during rotation 213 of the shaft (whether counter clockwise as illustrated or clockwise as illustrated). Thus, the optical energy receivers 207, 208 may be arranged where the reflected light 210 may be received by the optical sensor assembly 205 during rotation 213 of the shaft without being arranged where the reflected light 210 may not be received. This correspondence may reduce the number of the optical energy receivers 207, 208 that are used, allow room for other components, prevent usage of power that other optical energy receivers 207, 208 might consume, and so on.

Figure 4A:
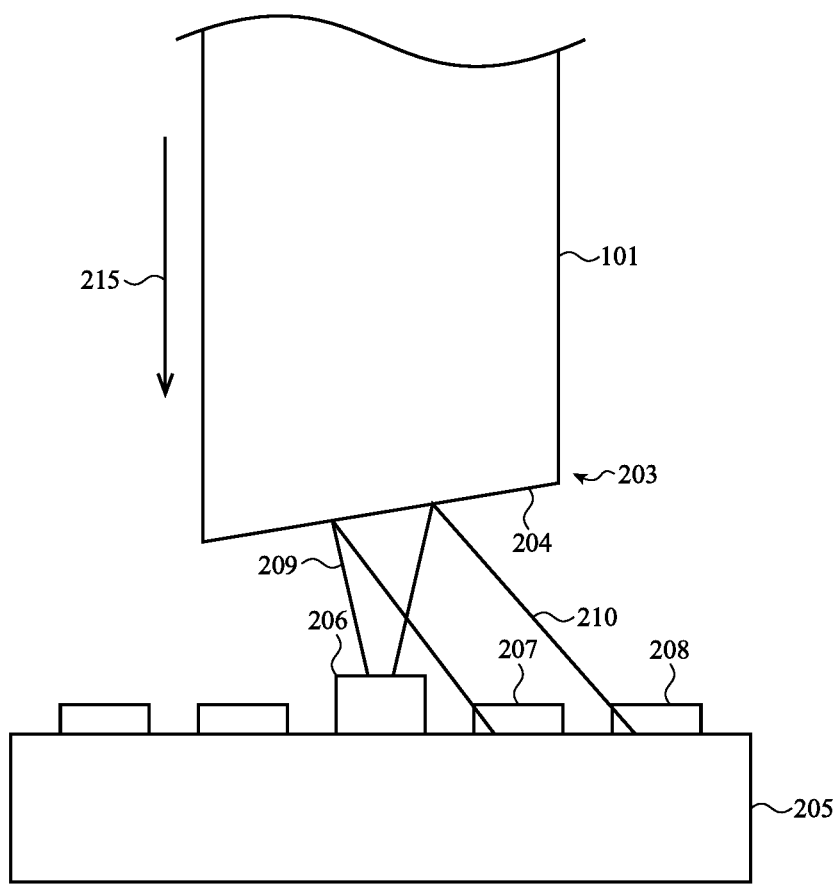
FIG. 4A depicts translation of the crown shaft of FIG. 2A toward the optical sensor assembly.
Figure 4B:
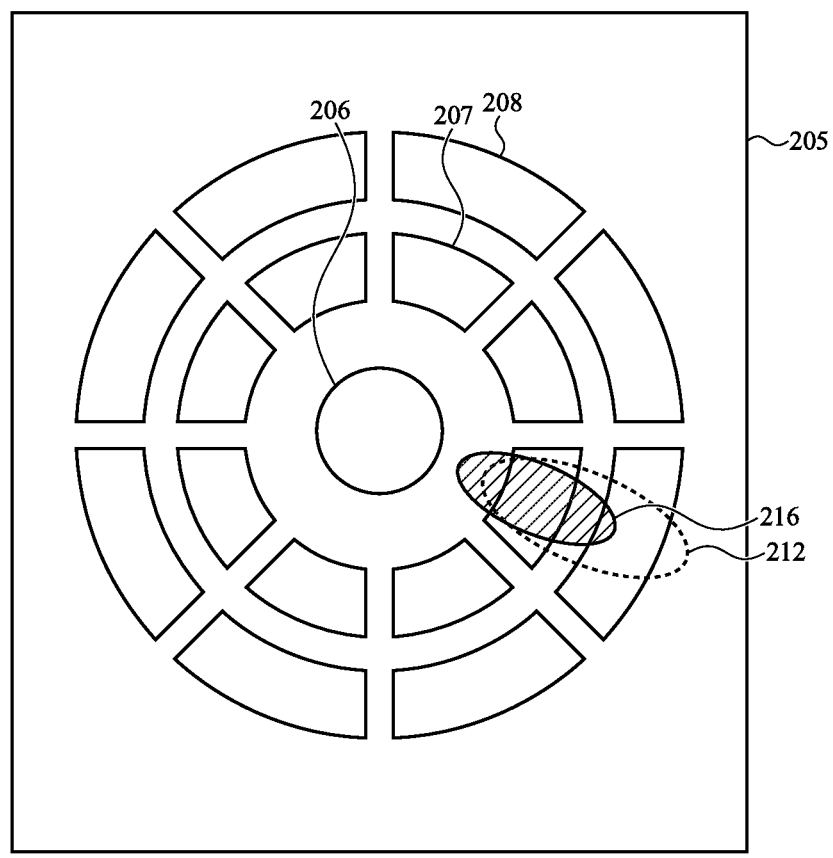
FIG. 4B depicts shifting of reflected light on the optical sensor assembly of FIG. 2B when the crown shaft translates as illustrated in FIG. 4A.

FIG. 4A depicts translation of the shaft 101 in a direction 215 toward the optical sensor assembly 205. FIG. 4B depicts shifting of reflected light on the optical sensor assembly 205 when the 101 shaft translates in the direction 215 illustrated in FIG. 4A. As shown, the translation of the shaft 101 in the direction 215 moves the sloped surface 204 closer to the optical energy transmitter 206, shifting the reflected light 210 from the outer set or ring of optical energy receivers 208 toward the inner ring or set of energy receivers 207 and from the previous position 212 to a new position 216. The shifting of the reflected light 210 between the previous position 212 to the new position 216 directly corresponds to the translation of the shaft 101 in the direction 215 and thus the movement of the sloped surface 204. Data from the optical energy receivers 207, 208 may be compared (such as by a processor or other processing unit or controller comparing light received by the optical energy receivers 207, 208 when the reflected light 210 is at the previous position 212 and the new position 216) to determine translation of the shaft 101 in the direction 215, a speed of the translation, and so on.

Figure 5A:
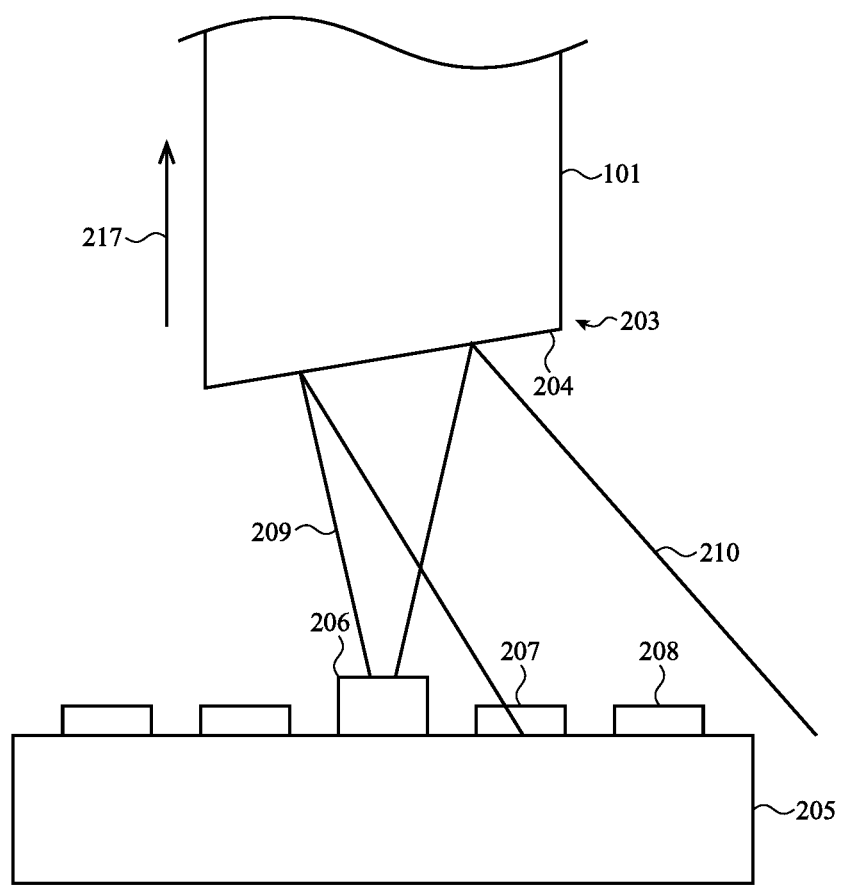
FIG. 5A depicts translation of the crown shaft of FIG. 2A away from the optical sensor assembly.
Figure 5B:
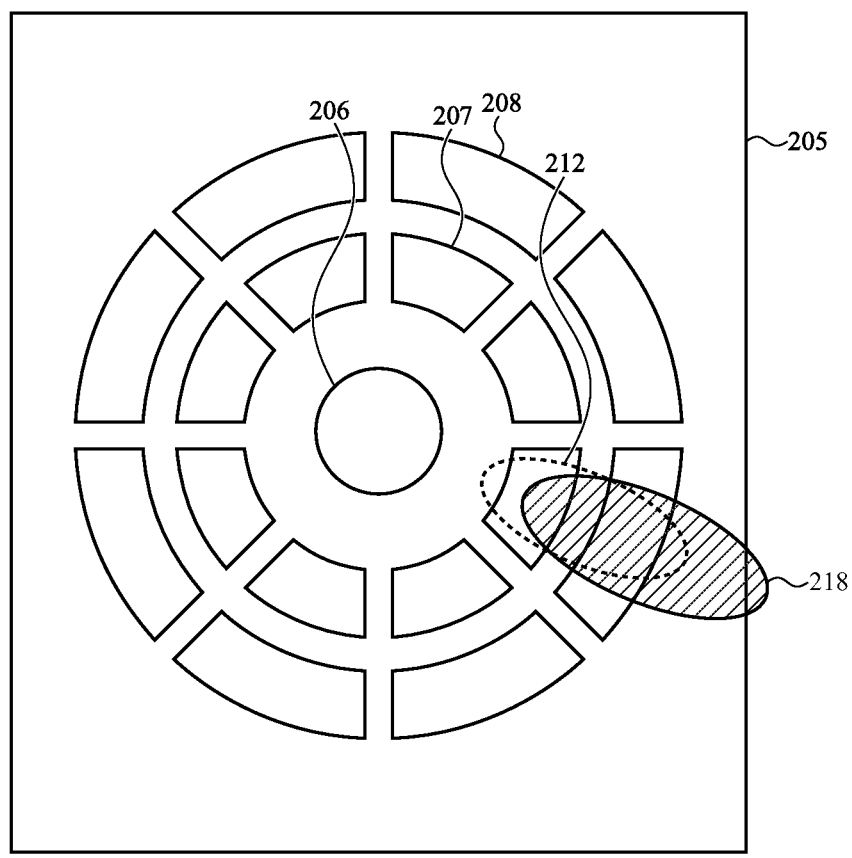
FIG. 5B depicts shifting of reflected light on the optical sensor assembly of FIG. 2B when the crown shaft translates as illustrated in FIG. 5A.

Conversely, FIG. 5A depicts translation of the shaft 101 in a direction 217 away from the optical sensor assembly 205. FIG. 5B depicts shifting of reflected light on the optical sensor assembly 205 when the shaft 101 translates in the direction 217 illustrated in FIG. 5A. As shown, the translation of the shaft 101 in the direction 217 moves the sloped surface 204 further away from to the optical energy transmitter 206, shifting the reflected light 210 from the inner set or ring of optical energy receivers 207 toward the outer ring or set of energy receivers 208 and from the previous position 212 to a new position 218. The shifting of the reflected light 210 between the previous position 212 to the new position 218 directly corresponds to the translation of the shaft 101 in the direction 217 and thus the movement of the sloped surface 204. Data from the optical energy receivers 207, 208 may be compared (such as by a processor or other processing unit or controller comparing light received by the optical energy receivers 207, 208 when the reflected light 210 is at the previous position 212 and the new position 218) to determine translation of the shaft 101 in the direction 217, a speed of the translation, and so on.

In short, the shaft 101 may be configured to move in a variety of different ways (such as any kind of displacement or motion). Any of these different movements may change the position of the sloped surface 204 with respect to the optical energy transmitter 206 and/or the optical energy receivers 207, 208, thus changing which of the optical energy receivers 207, 208 receive the reflected light 210 and/or how much of the reflected light 210 the optical energy receivers 207, 208 receive. These different movements may thus be detected by comparing data from the optical energy receivers 207, 208 regarding light received over time.

For example, though rotation and translation have been described above, tilt of the shaft 101 could also change the light received by the optical energy receivers 207, 208. As such, tilt of the shaft 101 may be detectable by comparing data from the optical energy receivers 207, 208 regarding light received over time.

In some embodiments, outputs from one or more of the optical energy receivers 207, 208 may be used to detect the current position of the shaft 101. The current position of the shaft 101 may be detected in this way even when the shaft 101 is not moving.

In various embodiments, a size of the reflected light in comparison to the size of each of the optical energy receivers 207, 208 may be evaluated. For example, if the reflected overlaps a little more than one of the optical energy receivers 207, 208, the amount of light received by each of the optical energy receivers 207, 208 may be used to determine a precise angular position of the shaft 101.

In numerous embodiments, the reflected light may be incident on both sets of rings of the optical energy receivers 207, 208 at the same time. As such, both rings may be used to determine the angular position of the shaft 101. This may especially be the case when the rings are radially offset. Radially offset rings of optical energy receivers 207, 208 may allow for precise determinations of the angular position of the shaft 101 as even minute differences in angular position of the shaft 101 may affect which of the optical energy receivers 207, 208 receive the reflected light and/or how much of the reflected light each receive.

In some embodiments, the rings of the optical energy receivers 207, 208 may be variously sized and/or positioned. In some examples, the rings may be sized to be closer or father from the axis of the shaft. This sizing and positioning of the rings may accommodate placement of other components within the wearable device 100.

As shown, the shaft 101 has a length that terminates at the end 203 and is perpendicular to the optical energy transmitter 206, with the sloped surface 204 facing the optical energy transmitter 206. However, it is understood that this is an example and that other configurations are possible without departing from the scope of the present disclosure.

For example, the angling of the sloped surface 204 is illustrated and described in FIGS. 4A-5B as shifting the light toward the inner set or ring of optical energy receivers 207 when the shaft 101 translates in the direction 215 toward the optical energy transmitter 206 and toward the outer set or ring of optical energy receivers 208 when the shaft 101 translates in the direction 217 away from the optical energy transmitter 206. However, it is understood that this is an example and that the angling or other geometry of the sloped surface 204 or other reflector may be configured otherwise in various other embodiments without departing from the scope of the present disclosure. For example, in some embodiments, the sloped surface 204 may instead may be angled or otherwise configured to shift the light toward the outer set or ring of optical energy receivers 208 when the shaft 101 translates in the direction 215 toward the optical energy transmitter 206 and toward the inner set or ring of optical energy receivers 207 when the shaft 101 translates in the direction 217 away from the optical energy transmitter 206.

In various embodiments, one or more of the optical energy receivers 207, 208 may be photodiodes, such as an array of photodiodes arranged on a silicon chip, a continuous impedance controlled photodiode segment mounted on silicon, and so on. For example, although the optical energy receivers 207, 208 are illustrated and described as concentric rings of discrete, separate sensor elements, this is for purposes of example. In some embodiments, each ring may be a continuous ring of photosensitive material, with taps to determine whether reflected light (and how much light) is incident on different segments of the ring. In numerous embodiments, the optical energy transmitter 206 may be a light emitting diode, such as an infrared light emitting diode, a vertical-cavity surface-emitting laser, and so on.

Although a particular configuration is shown, it is understood that this is an example. In various embodiments, the shaft 101, the end 203, the sloped surface 204, the optical sensor assembly 205, the optical energy transmitter, and/or one or more of the optical energy receivers 207, 208 may be configured in other arrangements without departing from the scope of the present disclosure.

Figure 6:
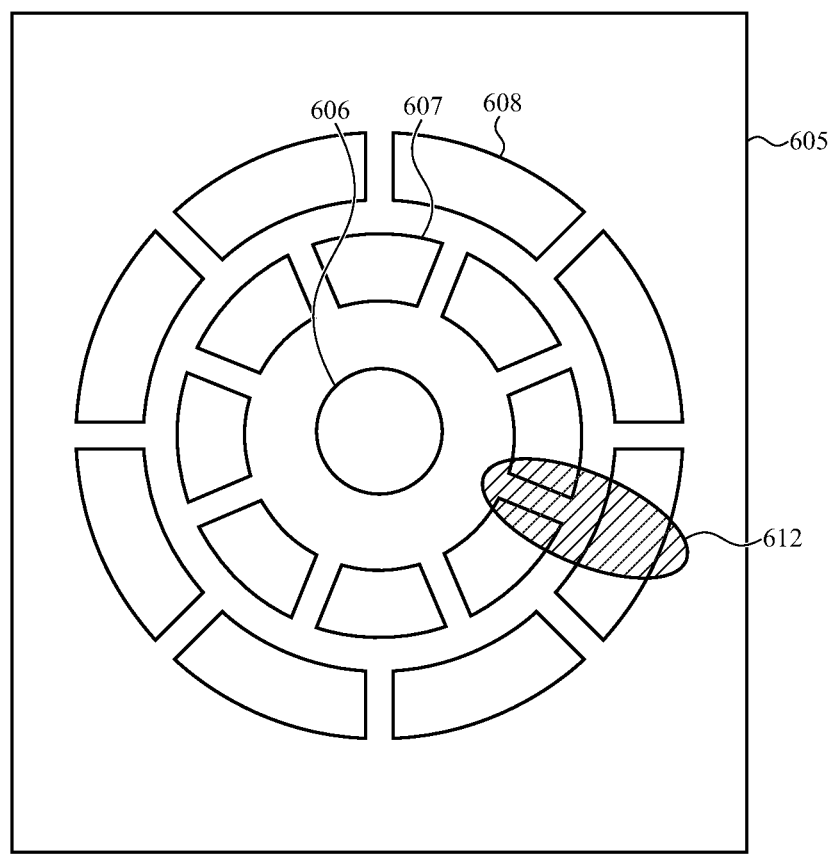
FIG. 6 depicts a first alternative example of the optical sensor assembly of FIG. 2B, in which the outer and inner optical energy receivers are radially offset.

For example, FIG. 2B illustrates an example of the optical sensor assembly 205 where outer and inner optical energy receivers 207, 208 may be aligned. However, other configurations are possible and contemplated. By way of example, FIG. 6 depicts an optical sensor assembly 605, in which the outer and inner optical energy receivers 607, 608 are radially offset. Staggering the outer and inner optical energy receivers 607, 608 may increase granularity of rotation determination.

In other examples, the outer and inner optical energy receivers 607, 608 may be configured in shapes other than rings. For example, the outer and inner optical energy receivers 607, 608 may be configured as squares, triangles, rectangles, polygons, irregular shapes, and so on.

Figure 7:
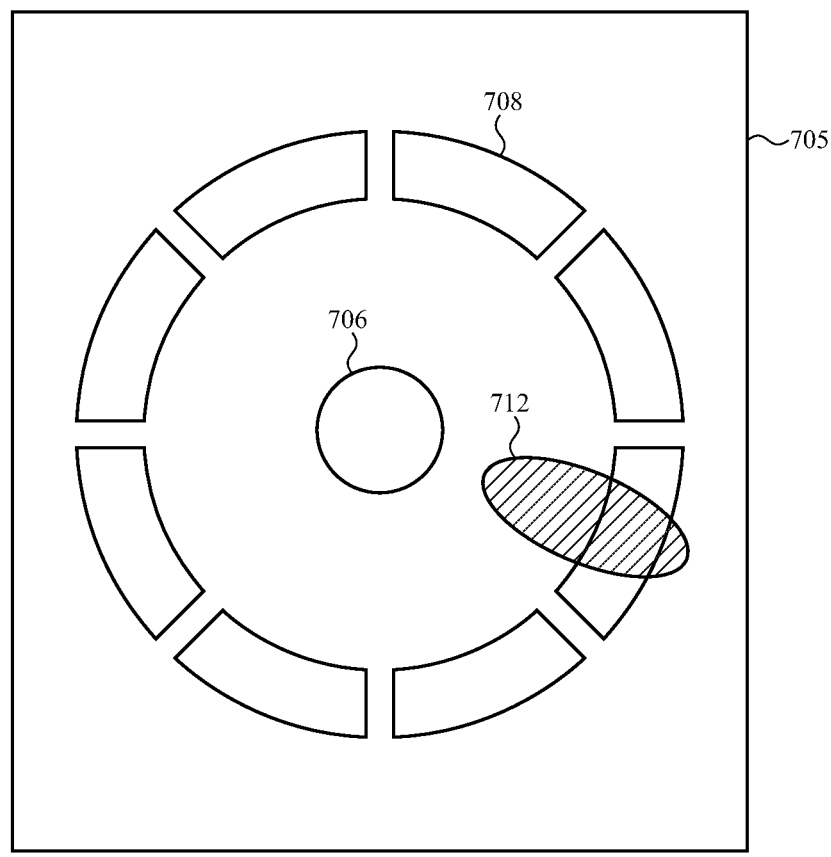
FIG. 7 depicts a second alternative example of the optical sensor assembly of FIG. 2B including a single ring of optical energy receivers.

Further, the optical sensor assembly 605 is illustrated and described as including the outer and inner optical energy receivers 607, 608. However, in various embodiments, optical energy receivers may be configured without positioning some within an area defined by others. For example, FIG. 7 depicts an optical sensor assembly 705 including a single ring of optical energy receivers 708. In such an example, movements such as translation, tilt, or other displacement of the shaft 701 may be measured based on whether or not the optical energy receivers 708 detect any light or receive amounts of light within different ranges (e.g., the wide part of a reflected light pattern, and thus more light, may be received by the optical energy receivers 708 in one state of shaft 701 translation and the tip of the reflected light pattern, and thus less light, may be received by the optical energy receivers 708 in another state of shaft 701 translation), as such movements may shift the light away from the optical energy receivers 708.

In other examples, additional rings or sets of optical energy receivers 708 may be used, such as inner, middle, and outer concentric rings or other nested configurations. Such multiple sets of concentric rings or other nested configurations may increase granularity of translation, tilt, or other displacement determination.

Returning to FIG. 2A, the light 209 is illustrated and described as reflected off of the sloped surface 204 at the end 203 of the shaft 101. However, it is understood that this is an example. In various embodiments, any kind of sloped surface or other reflector may be located in various positions to reflect the light 209 (such as where the end 203 of the shaft 101 is flat and the optical sensor assembly 205 is sloped) without departing from the scope of the present disclosure.

Figure 8:
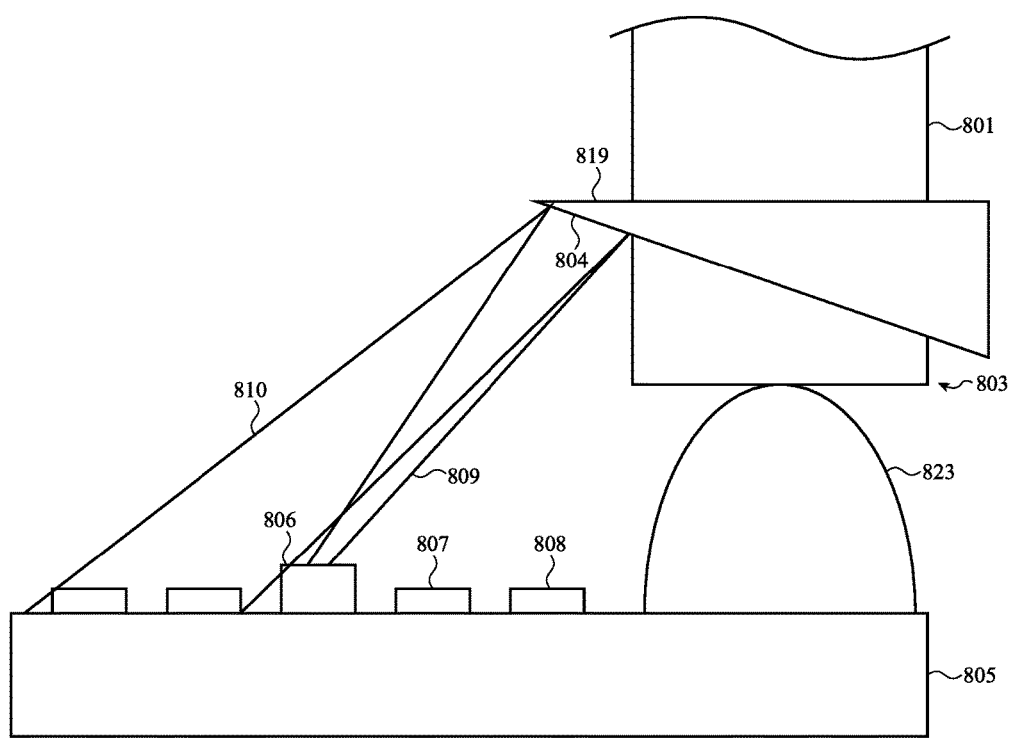
FIG. 8 depicts an axial cross-section of an internal end of the crown shaft shown in FIG. 1B, and an exemplary second relation of the shaft to an optical sensor assembly.

For example, FIG. 8 depicts an axial cross-section of an internal end of the crown shaft 801 shown in FIG. 1B, and an exemplary second relation of the shaft to an optical sensor assembly 805. Contrasted with FIG. 2A, the end 803 of the shaft 801 does not include a sloped surface. Instead, a reflector collar 819 is coupled to the shaft 801. The reflector collar 819 includes a sloped surface 804.

As further contrasted with FIG. 2A, the optical sensor assembly 805 is shifted (left with reference to the FIG. 8 as illustrated) so that the optical energy transmitter 806 does not directly face the end 803 of the shaft 801. Instead, the optical sensor assembly 805 is positioned off-center with the axis of the shaft 801 such that light 809 or other optical energy is transmitted from the optical energy transmitter 806 and reflected (off of the sloped surface 804 of the reflector collar 819) toward the optical energy receivers 807, 808 as reflected light 810. FIG. 8 is not shown to scale and the sloped surface 804 may be angled in various ways other than shown in order to reflect the light 809 as illustrated and described.

A switch 823 or other component may be coupled to optical sensor assembly 805 or other substrate. The shaft 801 may be moveable to actuate the switch 823. As shown, the shaft 801 may be in contact with the switch 823. In some examples, the shaft 801 may be electrically connected to the switch 823. For example, in some embodiments, the switch 823 may be electrically connected to the shaft 801 in order to electrically connect to a user touching the crown as part of performing an electrocardiogram test on the user.

Still other configurations are possible and contemplated. For example, FIG. 8 illustrates and describes the sloped surface 804 as coupled to the shaft 801 and the optical energy transmitter 806 and the optical energy receivers 807, 808 as separate from the shaft 801. However, in various examples, the optical energy transmitter 806 may be coupled to the shaft 801 and may transmit light 809 toward a sloped surface 804 that is separate from the shaft 801. In some embodiments of such examples, one or more of the optical energy receivers 807, 808 may be coupled to and/or separate from the shaft 801. Various configurations are possible and contemplated without departing from the scope of the present disclosure.

Figure 9:
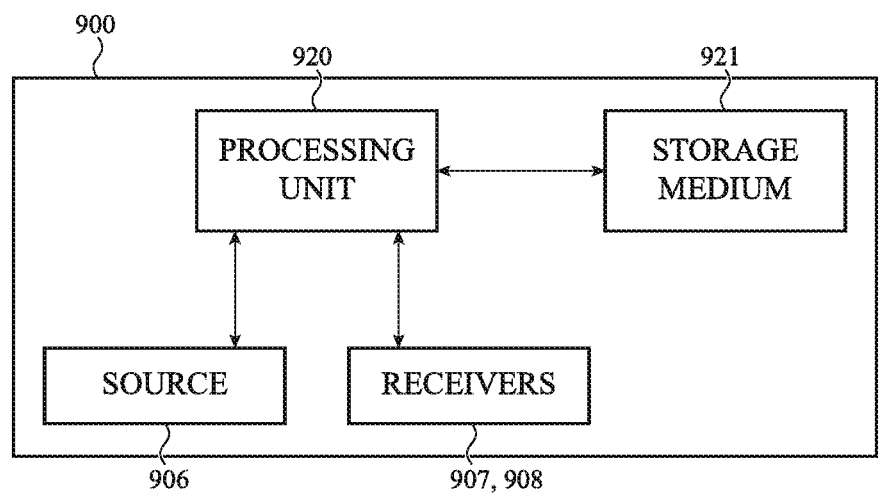
FIG. 9 depicts a block diagram illustrating example functional relationships of components that may be used to implement the wearable device of FIG. 1.

FIG. 9 depicts a block diagram illustrating example functional relationships of components that may be used to implement the wearable device 100 of FIG. 1. The wearable device 100 may include one or more processing units 920 and/or other processors or controllers; one or more light or other optical energy sources 906 or transmitters; one or more light or other optical energy receivers 907, 908; and one or more non-transitory storage media 921 (which may take the form of, but is not limited to, a magnetic storage medium; optical storage medium; magneto-optical storage medium; read only memory; random access memory; erasable programmable memory; flash memory; and so on).

The processing unit 920 may execute one or more instructions stored in the storage medium 921 to perform various wearable device functions. Such functions may include transmitting light or other optical energy using the energy source 906; receiving light or other optical energy using the energy receivers 907, 908; determining movement of a shaft or other element of an input device such as a crown using light or other optical energy received using the energy receivers 907, 908; and so on. Various configurations are possible and contemplated without departing from the scope of the present disclosure.

The wearable device 100 may also include a variety of other components. Such components may include, but are not limited to, various sensors, touch screens, displays, speakers, microphones, global positioning systems, communication components, antennas, and so on.

Returning to FIG. 1, although the crown including the shaft 101 is illustrated and described as an input device for a wearable device 100, it is understood that this is an example. In various embodiments, the crown may be an input device for a variety of different devices. Examples of such devices include, but are not limited to desktop computing devices, laptop computing devices, smart phones, cellular telephones, tablet computing devices, mobile computing devices, displays, printers, track pads, kitchen appliances, automobiles, fitness monitors, and so on.

Further, although the shaft 101 is illustrated and described as part of a crown, it is understood that this is an example. In various embodiments, the shaft 101 and/or crown may be another input device structure that includes a moveable shaft or other structure. Examples of such input device include, but are not limited to, buttons, joysticks, direction pads, keys, knobs, dials, and so on.

Additionally, although the present disclosure is illustrated and described as reflecting light or other optical energy, it is understood that this is an example. In various embodiments, light may be refracted, deflected, and/or otherwise redirected without departing from the scope of the present disclosure. Various configurations are possible and contemplated.

FIGS. 10A-12B generally depict examples of manipulating graphics displayed on an electronic device through inputs provided by rotating a crown of the device. This manipulation (e.g., selection, acknowledgement, motion, dismissal, magnification, and so on) of a graphic may result in changes in operation of the electronic device and/or graphics displayed by the electronic device. Although specific examples are provided and discussed, many operations may be performed by rotating and/or translating a crown incorporating an optical position sensor. Accordingly, the following discussion is by way of example and not limitation.

Figure 10A:
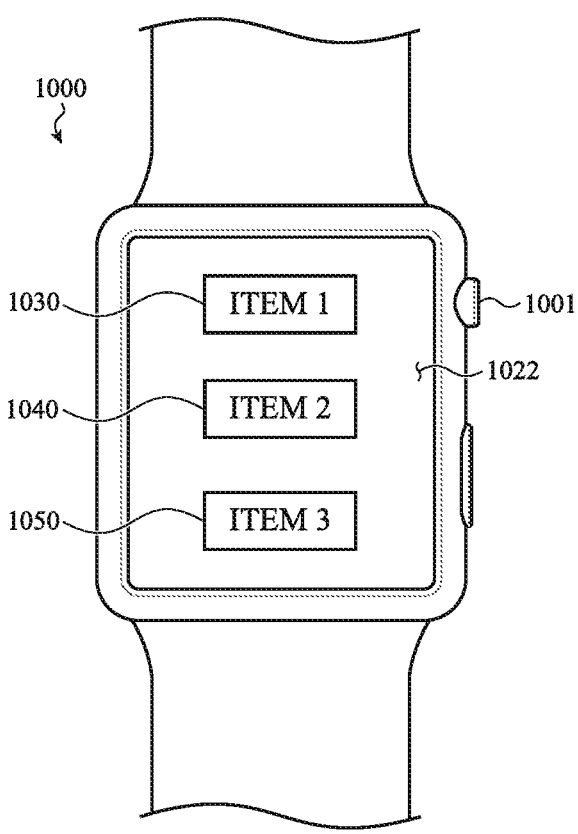
FIG. 10A illustrates a list, displayed on an electronic device, that may be controlled by rotation of a crown.

FIG. 10A depicts a sample electronic device (shown here as an electronic watch 1000) having a rotatable crown 1001. The rotatable crown 1001 may be, or incorporate, any rotary encoder described herein. A display 1022 shows information and/or other graphics. In the current example, the display 1022 depicts a list of various items 1030, 1040, 1050, all of which are example graphics.

Figure 10B:
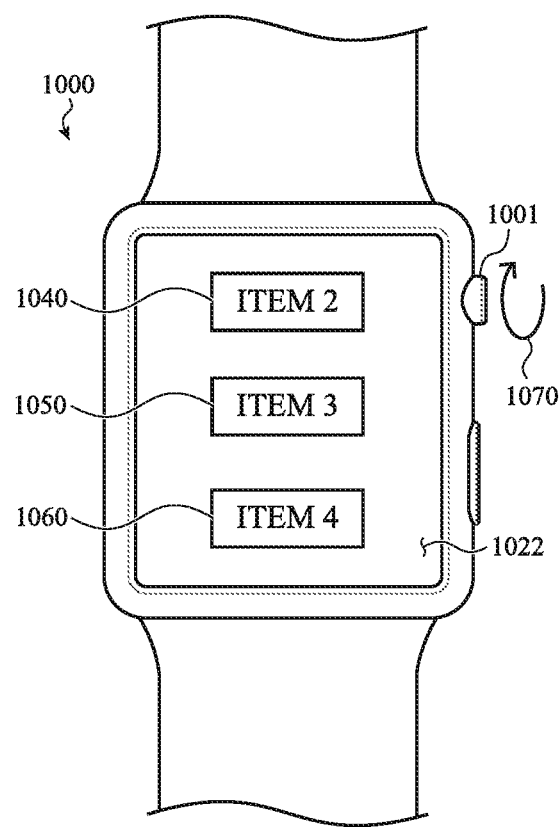
FIG. 10B illustrates the list of FIG. 10A, changed in response to rotation of the crown.

FIG. 10B illustrates how the graphics shown on the display 1022 change as the crown 1001 rotates (as indicated by the arrow 1070). Rotating the crown 1001 causes the list to scroll or otherwise move on the screen, such that the first item 1030 is no longer displayed, the second and third items 1040, 1050 each move upwards on the display, and a fourth item 1060 is now shown at the bottom of the display. This is one example of a scrolling operation that can be executed by rotating the crown 1001. Such scrolling operations may provide a simple and efficient way to depict multiple items relatively quickly and in sequential order. A speed of the scrolling operation may be controlled by the speed at which the crown 1001 is rotated-faster rotation may yield faster scrolling, while slower rotation yields slower scrolling. The crown 1001 may be translated (e.g., pushed inward toward the display 1022 or watch body) to select an item from the list, in certain embodiments.

Figure 11A:
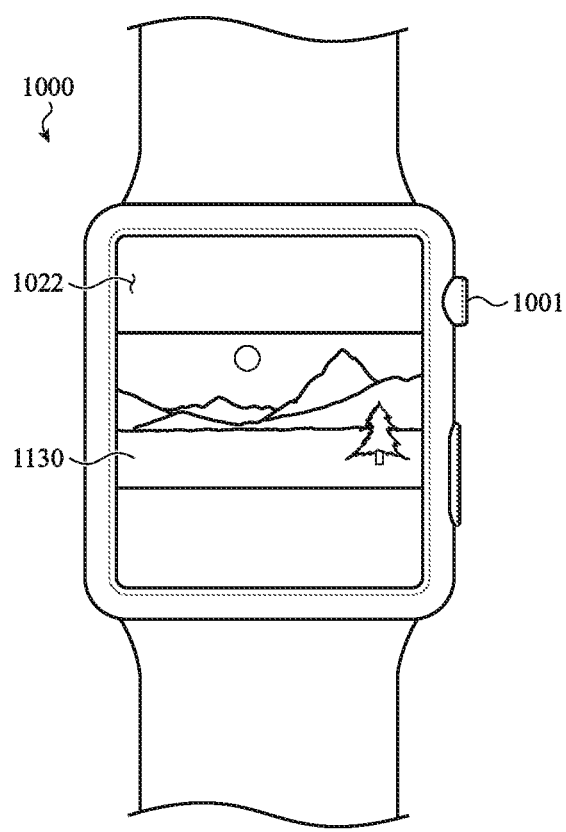
FIG. 11A illustrates an electronic device displaying a picture, the magnification of which may be controlled by rotation of a crown.
Figure 11B:
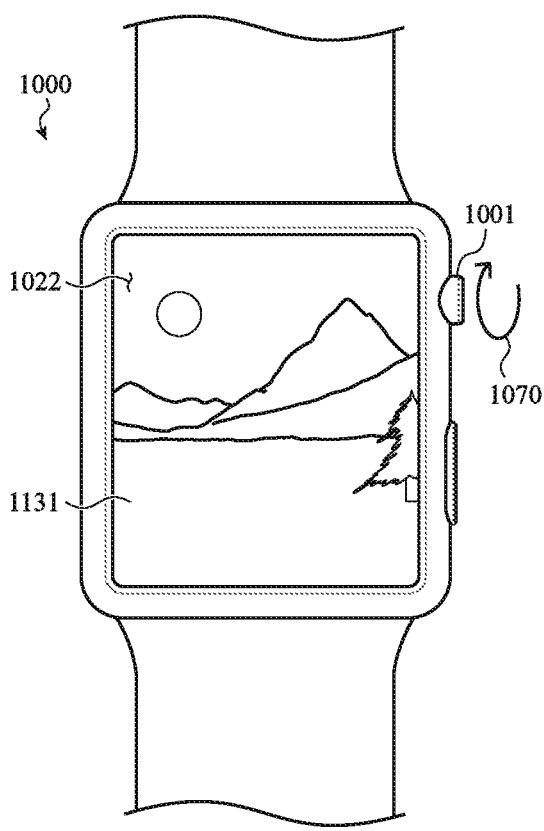
FIG. 11B illustrates the picture of FIG. 11A, changed in response to rotation of the crown.

FIGS. 11A-11B illustrate an example zoom operation. The display 1022 depicts a picture 1130 at a first magnification, shown in FIG. 11A; the picture 1130 is yet another example of a graphic. As the crown 1001 of the electronic watch 1000 rotates (again, illustrated by arrow 1070), the display may zoom into the picture, such that a portion 1131 of the picture is shown at an increased magnification. This is shown in FIG. 11B. The direction of zoom (in vs. out) and speed of zoom, or location of zoom, may be controlled through rotation of the crown 1001, and particularly through the direction of rotation and/or speed of rotation. Rotating the crown in a first direction may zoom in, while rotating the crown in an opposite direction may zoom out. Alternately, rotating the crown in a first direction may change the portion of the picture subject to the zoom effect. In some embodiments, pressing the crown may toggle between different zoom modes or inputs (e.g., direction of zoom vs. portion of picture subject to zoom). In yet other embodiments, pressing the crown may return the picture 1130 to the default magnification shown in FIG. 11A.

Figure 12A:
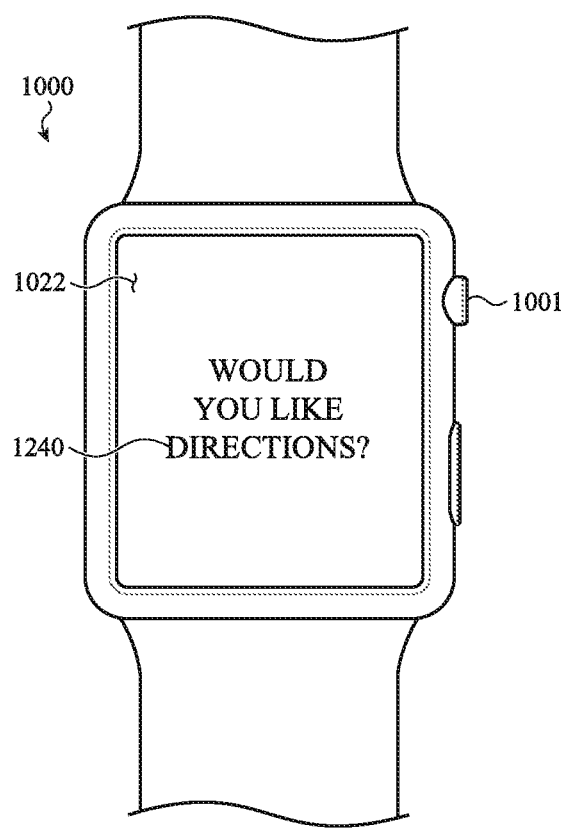
FIG. 12A illustrates an electronic device displaying a question that may be answered by rotating a crown.
Figure 12B:
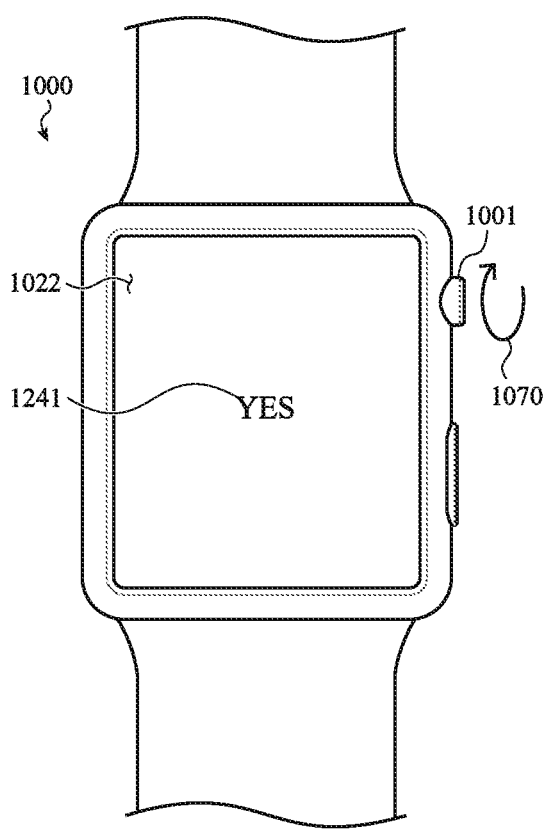
FIG. 12B illustrates the electronic device of FIG. 12A, with the question answered through rotation of the crown.

FIGS. 12A-12B illustrate possible use of the crown 1001 to change an operational state of the electronic watch 1000 or otherwise toggle between inputs. Turning first to FIG. 12A, the display 1022 depicts a question 1240, namely, "Would you like directions?" As shown in FIG. 12B, the crown 1001 may be rotated (again, illustrated by arrow 1070) to answer the question. Rotating the crown provides an input interpreted by the electronic watch 1000 as "yes," and so "YES" is displayed as a graphic 1241 on the display 1022. Rotating the crown 1001 in an opposite direction may provide a "no" input.

In the embodiment shown in FIGS. 12A-12B, the crown's rotation is used to directly provide the input, rather than select from options in a list (as discussed above with respect to FIGS. 10A-10B).

Figure 13:
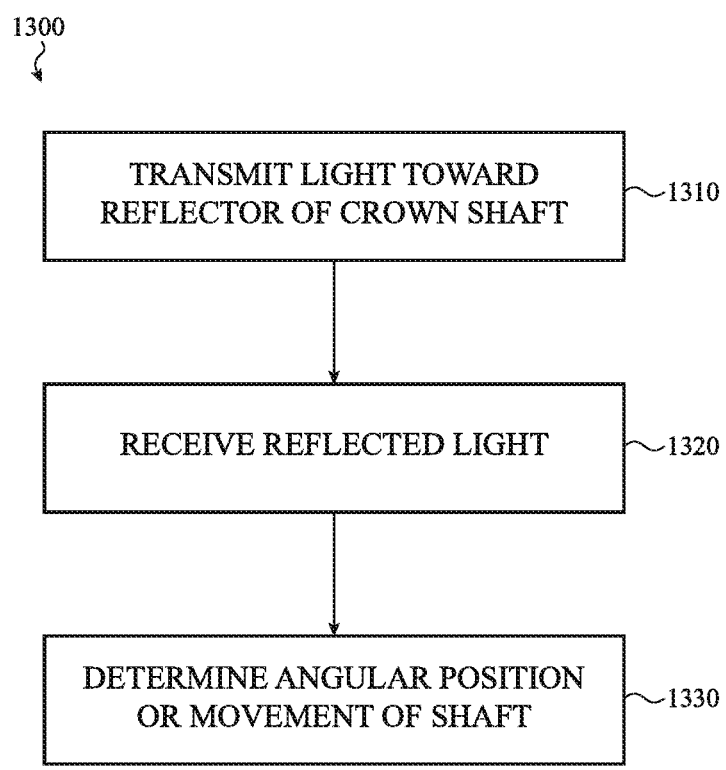
FIG. 13 depicts a flow chart illustrating an example method for operating an optical position sensor for a crown.

FIG. 13 depicts a flow chart illustrating an example method 1300 for operating an optical position sensor for a crown. The method 1300 may be performed using one or more of the devices depicts in FIGS. 1-12B.

At 1310, light may be transmitted toward the reflector of a crown shaft. For example, light may be transmitted as shown in FIGS. 2A, 3A, 4A, 5A, 6, and/or 8. At 1320, reflected light may be received. For example, light may be received as illustrated in FIGS. 2A-8. At 1330, an angular position or movement of the shaft may be determined using the received reflected light.

Although the example method 1300 is illustrated and described as including particular operations performed in a particular order, it is understood that this is an example. In various embodiments, various orders of the same, similar, and/or different operations may be performed without departing from the scope of the present disclosure.

For example, the example method 1300 is illustrated and described as transmitting light towards the reflector of a crown shaft. However, in various embodiments, the light may be transmitted from a light source on the crown shaft towards a reflector positioned elsewhere. Various configurations are possible and contemplated without departing from the scope of the present disclosure.

As mentioned previously, rotational input from a crown of an electronic device may control many functions beyond those listed here. The crown may rotate to adjust a volume of an electronic device, a brightness of a display, or other operational parameters of the device. The crown may rotate to turn a display on or off, or turn the device on or off. The crown may rotate to launch or terminate an application on the electronic device. Further, translational input of the crown may likewise initiate or control any of the foregoing functions, as well.

As described above and illustrated in the accompanying figures, the present disclosure relates to optically sensing motion of an input device, such as a watch crown. An electronic device includes an input mechanism that may be manipulated by a user to move in order for the user to provide input. An optical sensor assembly may transmit light or other optical energy at a reflector and receives the reflected light. Movement of the input mechanism may change where the reflector reflects the light. Based on changes in where the reflected light is received, the electronic device may determine the motion of the input mechanism. The electronic device may be able to detect rotation of the input mechanism; a rotation speed; a rotation direction; translation, tilt, or other displacement of the input mechanism; and so on. In this way, the electronic device may determine the movement of the input mechanism without causing wear on contacting parts. Space may also be conserved as components such as dome switches may not be used.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    a crown having a shaft, the crown operable to rotate and translate the shaft, the shaft having an end defining a sloped surface;
    an optical energy transmitter that transmits optical energy toward the sloped surface;
    concentric rings of optical energy receivers that encircle the optical energy transmitter and are operable to receive reflected optical energy from the sloped surface; and
    a processing unit that is operable to determine a first position of the shaft using:
        a second position of the reflected optical energy on the optical energy receivers; and
        a variable output of the optical energy receivers.

2. The electronic device of claim 1, wherein rotation of the shaft rotates the reflected optical energy along the concentric rings.

3. The electronic device of claim 1, wherein translation of the shaft toward the optical energy transmitter shifts the reflected optical energy from an outer ring of the concentric rings toward an inner ring of the concentric rings.

4. The electronic device of claim 1, wherein translation of the shaft away from the optical energy transmitter shifts the reflected optical energy from an inner ring of the concentric rings toward an outer ring of the concentric rings.

5. The electronic device of claim 1, wherein the shaft:
has a length that terminates at the end; and
is perpendicular to the optical energy transmitter, with the sloped surface facing the optical energy transmitter.

6. The electronic device of claim 1, wherein the optical energy receivers comprise photodiodes.

7. The electronic device of claim 1, wherein the optical energy transmitter comprises an infrared light emitting diode.

8. The electronic device of claim 1, wherein the concentric rings of optical energy receivers comprise continuous impedance controlled photodiode segments.

9. An electronic device, comprising:
a shaft including a reflector;
an optical energy transmitter operable to transmit optical energy at the reflector;
a group of optical energy receivers operable to receive reflected optical energy from the reflector, the group of optical energy receivers disposed in a first circle and a second circle, the second circle located within the first circle; and
a processing unit operable to determine a position of the shaft based on the reflected optical energy received by the group of optical energy receivers.

10. The electronic device of claim 9, wherein the processing unit is operable to determine a speed or direction of rotation of the shaft based on the reflected optical energy received by the group of optical energy receivers.

11. The electronic device of claim 9, wherein the processing unit is operable to determine a translation of the shaft based on the reflected optical energy received by the group of optical energy receivers.

12. The electronic device of claim 9, wherein the processing unit is operable to determine a tilt of the shaft based on the reflected optical energy received by the group of optical energy receivers.

13. The electronic device of claim 9, wherein the processing unit is operable to determine a displacement of the shaft based on the reflected optical energy received by the group of optical energy receivers.

14. The electronic device of claim 9, wherein the processing unit determines the position of the shaft by comparing the reflected optical energy received by optical energy receivers of the group of optical energy receivers.

15. The electronic device of claim 9, wherein the group of optical energy receivers disposed in the first circle are aligned with the group of optical energy receivers disposed in the second circle.

16. The electronic device of claim 9, wherein the group of optical energy receivers disposed in the first circle are radially offset from the group of optical energy receivers disposed in the second circle.

17. An electronic device, comprising:
a housing;
a crown moveably coupled to the housing, the crown comprising a shaft having an end that defines a reflector;
an optical sensor assembly, disposed within the housing, comprising
an optical energy transmitter operable to transmit optical energy toward the reflector;
a first set of optical energy receivers disposed in a first circular arrangement at a first radius from the optical energy transmitter; and
a second set of optical energy receivers disposed in a second circular arrangement at a second radius from the optical energy transmitter; and
a processing unit operable to determine a position of the shaft based on the optical energy received from the reflector by at least one of the first set of optical energy receivers or the second set of optical energy receivers.

18. The electronic device of claim 17, further comprising a switch, wherein movement of the shaft is operative to actuate the switch.

19. The electronic device of claim 18, wherein the switch is electrically connected to the shaft.

20. The electronic device of claim 17, wherein:
the optical sensor assembly further comprises a silicon chip; and
the optical energy transmitter, the first set of optical energy receivers, and the second set of optical energy receivers are coupled to the silicon chip.

* * * * *